United States Patent [19]

Wagner

[11] 4,221,575

[45] Sep. 9, 1980

[54] PNEUMATICALLY OPERATED AIRFLOW VALVE

[75] Inventor: Frederic M. Wagner, Forest City, Iowa

[73] Assignee: The United States of America as represented by the Secretary of the Army, Washington, D.C.

[21] Appl. No.: 27,229

[22] Filed: Apr. 5, 1979

[51] Int. Cl.$^2$ .............................................. B01D 46/42
[52] U.S. Cl. ........................................ 55/310; 55/213; 55/418; 55/316; 55/467; 55/473; 165/16; 251/61.2
[58] Field of Search .................... 55/312–314, 55/316, 310, 419, 467, 470–473, 210, 213, 418; 251/61.1, 61.2; 98/33 A, 37; 165/16

[56] References Cited
U.S. PATENT DOCUMENTS

| | | |
|---|---|---|
| 2,091,562 | 8/1937 | Palmer ................................ 165/16 |
| 2,327,664 | 8/1943 | Otis ..................................... 98/33 A |
| 3,687,570 | 8/1972 | Ellison ................................ 251/61.2 |
| 3,766,844 | 10/1973 | Donnelly et al. ................... 55/316 |
| 3,899,311 | 8/1975 | Rapp ................................... 55/311 |

Primary Examiner—Bernard Nozick
Attorney, Agent, or Firm—Nathan Edelberg; Robert P. Gibson; A. Victor Erkkila

[57] ABSTRACT

A novel, automatic, pneumatically operated bypass valve is provided in an air duct connecting a fan powered gas-particulate filter unit and an air conditioner unit. The bypass valve contains a bellows, which is automatically inflated by pressurized air transmitted thereto from the filter unit through a separate conduit, thereby closing the bypass valve when the filter unit fan is in operation. When the filter unit fan is turned off, the pressure in the filter unit falls to ambient, which automatically deflates the bellows and opens the bypass valve to provide a fresh air path to the air conditioner unit.

7 Claims, 4 Drawing Figures

PNEUMATICALLY OPERATED AIRFLOW VALVE

GOVERNMENTAL INTEREST

The invention described herein may be manufactured, used, and licensed by or for the Government for Governmental purposes without the payment to me of any royalties thereon. The invention described was made in the course of a contract with the Government.

BACKGROUND OF THE INVENTION

Gas masks and protective clothing are generally employed to protect persons working in an atmosphere containing toxic gases, vapors, fumes, smoke and the like resulting from industrial disasters, military attack, etc. In some situations it is necessary to provide protective shelters, e.g. compartments, vehicles and vans, wherein personnel can be free from the restraints of masks and protective clothing to assure completion of the mission during the emergency. Such shelters must be provided with an air conditioner unit and a filter unit containing a filter for removing toxic gases and a filter for removing particulate matter. The gas-particulate filter unit contains a fan or blower to force the ambient air through the filters, which remove the toxic gases and particulate matter. The purified air from the filter unit then flows through an air duct to the fresh air inlet of the air conditioner unit which cools and circulates the pruified air into the shelter.

When the gas-particulate filter unit is thus connected to the fresh air inlet of the air conditioner, all make-up air to the air conditioner must pass through the filter unit. However, the air conditioner unit cannot draw adequate make-up air through the filter unit when the filter unit fan is not operating. Consequently, a bypass valve is required in the air duct between the filter unit and the air conditioner unit, which would be open to the atmosphere when the filter unit fan is not in operation and thus provide make-up air to the air conditioner unit. A manually operated bypass valve is unsatisfactory, since it leaves room for human error, while an electrically operated valve is subject to electrical problems.

SUMMARY OF THE INVENTION

An object of the present invention is to provide a bypass valve in the air duct between the filter unit and the air conditioner unit, which is open when the filter unit fan is not operating and provides a free air path to the air conditioner, and automatically closes when the filter unit fan is operating to prevent air from bypassing the filter unit.

Another object of the invention is to provide a novel bypass valve for automatically regulating the fresh air path to the air conditioner unit, which is simple, inexpensive, lightweight and pneumatically operated and hence free from electrical problems.

In accordance with the present invention the air duct between the filter unit and the fresh air inlet of the air conditioner unit is provided with a pneumatically operated airflow bypass valve, which is normally open to the atmosphere and provides a fresh air path to the air conditioner when the filter unit fan is not in operation, and is automatically closed by pneumatic pressure transmitted thereto from the filter unit via a separate conduit when the filter unit fan is in operation. The bypass valve contains a flexible bellows or a similar expansible boot, which when the filter unit fan is in operation is inflated and expanded by the pressurized air conducted thereto via separate conduit from the filter unit, thereby sealing the bypass valve opening to the atmosphere. When the filter unit fan is not in operation, the air pressure in the filter unit falls to ambient, whereby the flexible bellows or similar device is not pressurized and hence contracts to its normal size, thereby opening the bypass valve and permitting the ambient air to be drawn through said valve by means of the air conditioner fan or other means.

DETAILED DESCRIPTION OF THE INVENTION

Figure 1:
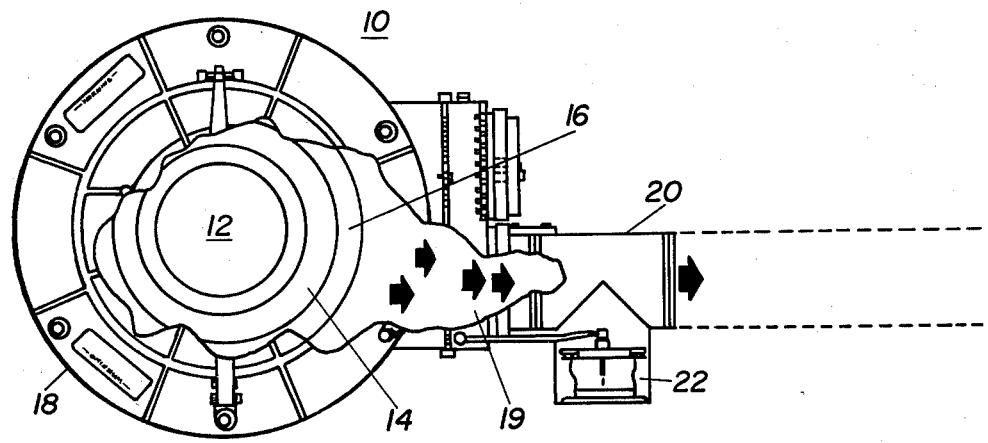
FIG. 1 is a partial cross-sectional view of a filter unit and a pneumatically operated bypass valve of the present invention showing the filter unit in operation.
Figure 2:
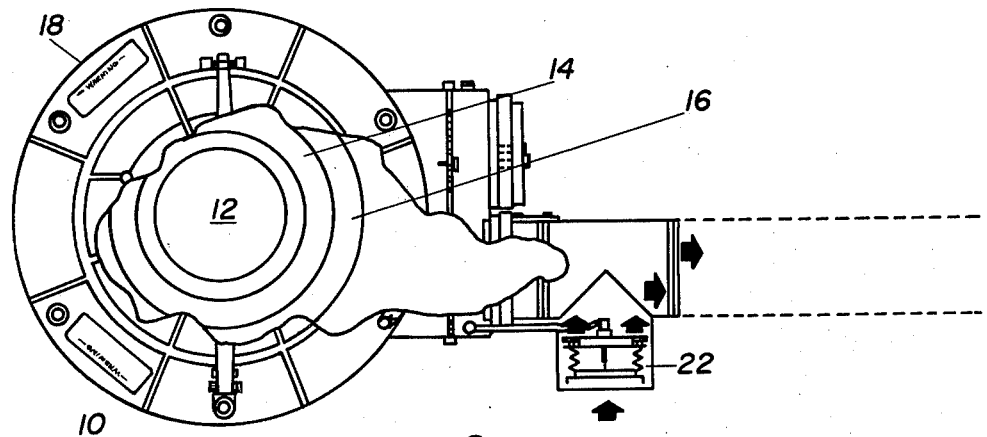
FIG. 2 shows the filter unit and bypass valve illustrated in FIG. 1 when the filter unit is not in operation.
Figure 4:
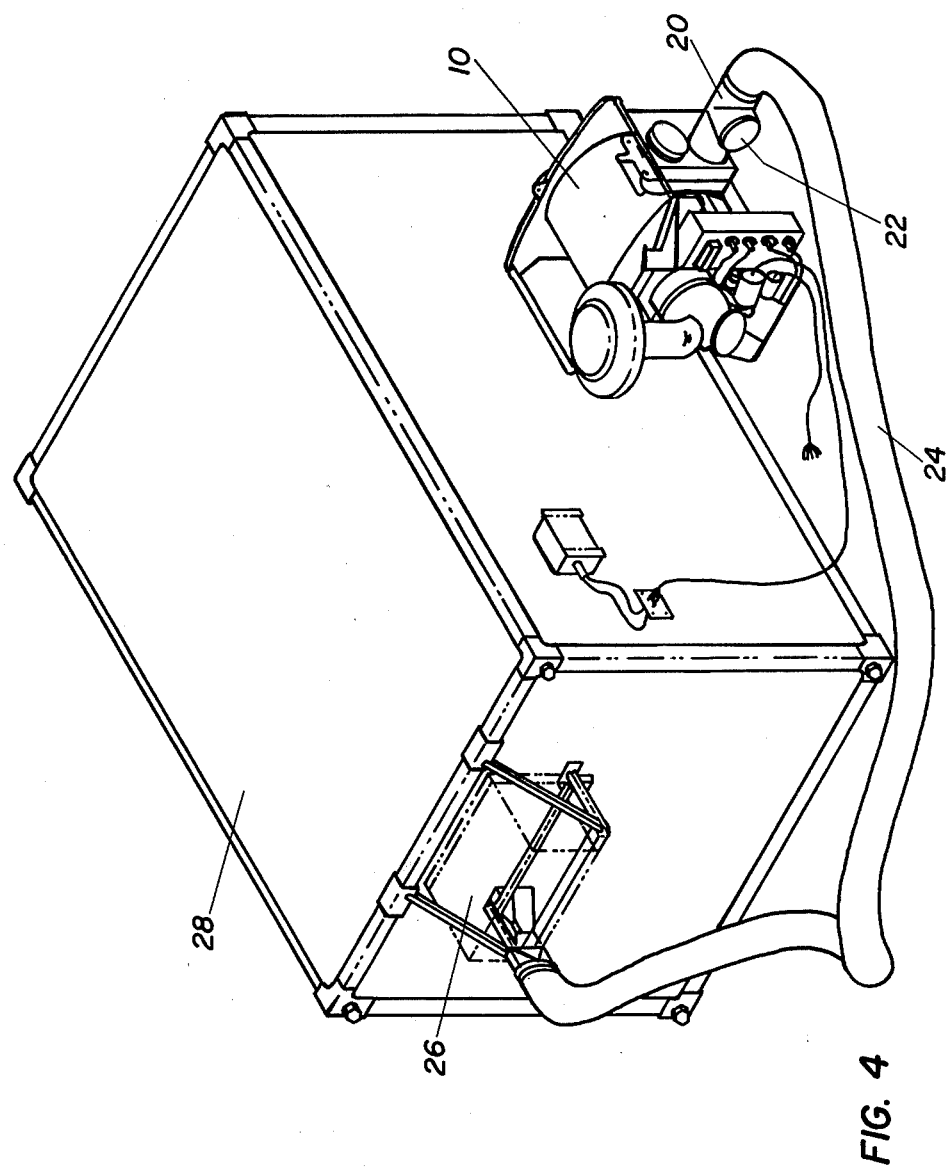
FIG. 4 is a perspective view of a protected compartment with a pneumatically operated airflow bypass valve in the air duct between the filter unit and the air conditioner unit.

FIG. 1 shows a conventional filter unit 10 comprising a cylindrical fan or blower 12 surrounded by a cylindrical particulate filter 14 and a cylindrical gas filter 16 mounted in a housing 18. The housing 18 has an air inlet port (not shown) and an outlet port 19 joined to an outlet pipe 20 containing a bypass valve 22. As shown in FIG. 4 the outlet pipe 20 is connected to a flexible air duct 24 leading to the air intake of an air conditioner 26, which supplies conditioned air to a protected compartment 28.

When the gas-particulate filter unit is not in operation, a bypass valve is required to provide a fresh air path to the air conditioner, since ambient air cannot be drawn through the filter unit by the relatively weak suction of the air conditioner intake fan due to the resistance of the gas and particulate filters to air flow.

Figure 3:
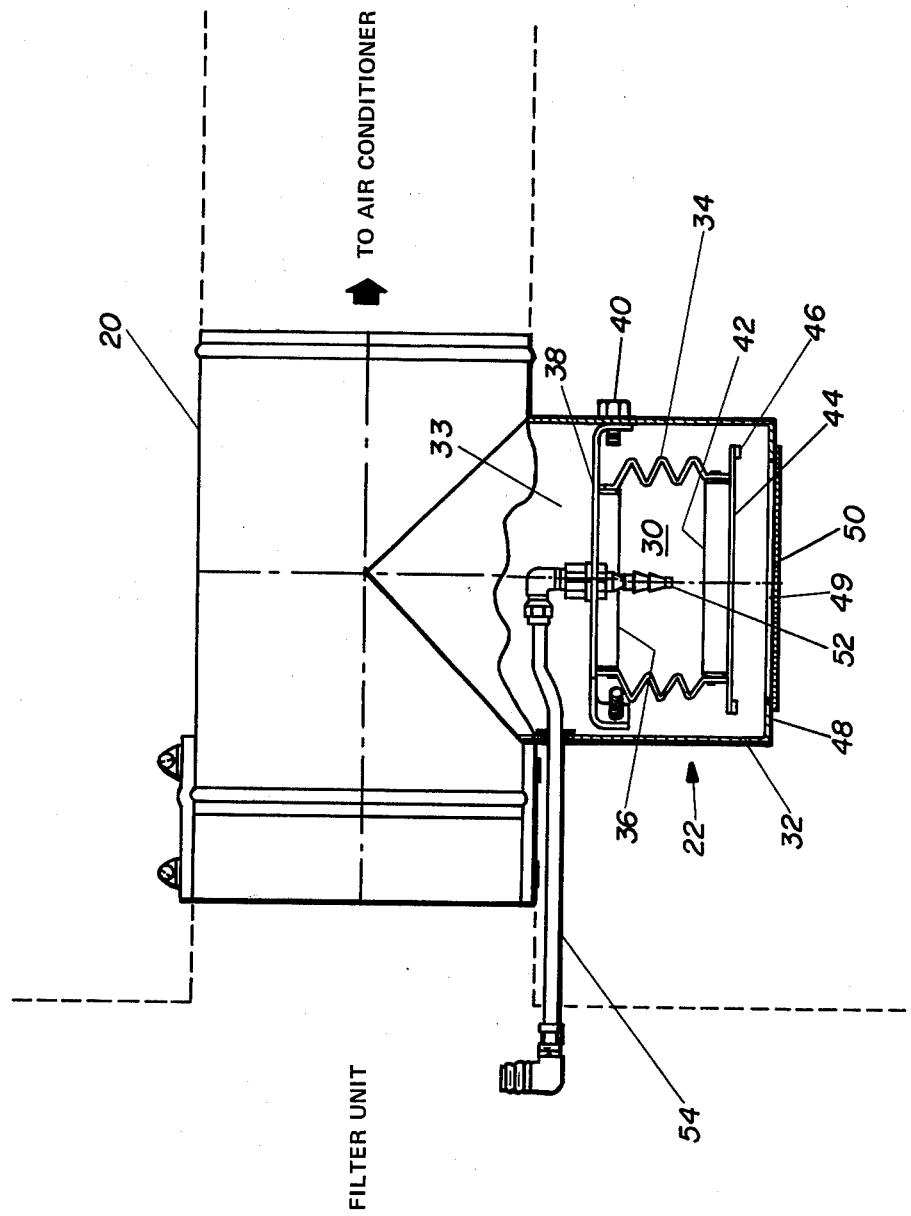
FIG. 3 is a partial cross-sectional view of a pneumatically operated airflow valve of the present invention.

The bypass valve 22, shown in greater detail in FIG. 3, comprises a bellows 30 contained in a tubular housing 32 which is attached at one open end or port 33 normal to a matched opening in the outlet pipe 20 connected to the filter unit outlet port 19. The bellows 30 includes an expansible resilient, pleated hose or boot 34, whose one end is attached to a collar 36 affixed to one side of a support plate 38, which is mounted in the tubular housing 32 by bolts 40, and whose other end is attached to a collar 42 affixed to the rearward side of a circular valve plate 44. The forward side of the valve plate 44 includes a circular rubber washer 46, which when the bellows is expanded, engages an annular flange 48 on the open, fresh-air inlet end 49 of the tubular valve housing 32. The fresh-air inlet 49 is covered by a protective wire screen 50. Centrally mounted on the bellows support plate 38 is a nozzle 52, which is connected by a tubing 54 to the filter unit housing 18.

The pleated bellows hose or boot 34 can be constructed of any resilient or elastic material, such as rubber, or contain a spring embedded therein or otherwise attached thereto, whereby the bellows contracts automatically to its initial size when it is not inflated by the pressurized air transmitted thereto from the filter unit housing 18 via the tubing 54.

When the filter unit fan is in operation, the air pressure within the filter unit is greater than the ambient air pressure. This air pressure differential causes air to flow from filter unit housing 18 through tubing 54 and nozzle 52 into the bellows 30, which causes the bellows to expand and drive the plate 44 against the flange 48 on the fresh-air inlet end 49 of the bypass valve housing 32, thereby blocking said inlet and obstructing any airflow through same. When the filter unit fan is turned off, the air pressure within the filter unit returns to ambient pressure whereby the bellows 30 deflates. This causes the bellows to contract automatically to its normal size, which draws the valve plate 44 away from the flange 48 and thereby allows ambient air to enter the valve inlet 49 and bypass the filter unit 10 to the air conditioner 26.

The foregoing disclosure and drawings are merely illustrative of the principles of this invention and are not to be interpreted in a limiting sense. I wish it to be understood that I do not desire to be limited to the exact details of construction shown and described because obvious modifications will occur to a person skilled in the art.

I claim:

1. An apparatus comprising in combination:
   a housing including an inlet port for ambient air, and an outlet port for filtered air,
   a filter means disposed within said housing,
   a fan means disposed within said housing for moving ambient air through said filter means and said housing under superatmospheric pressure,
   an air duct attached to said housing outlet port,
   a pneumatically operated bypass valve in said air duct comprising
      a housing having an inlet port for ambient air and an outlet port for passage of ambient air into said air duct,
      an inflatable, resilient bellows means mounted within said valve housing, which normally is deflated and does not close said inlet port but closes said inlet port when inflated, and
      a conduit for communicating air pressure from said filter housing to said bellows means to inflate said bellows means,
   whereby said bypass valve inlet port is automatically closed by inflation of said bellows means with superatmospheric pressurized air introduced via said conduit from said filter housing when the fan is in operation, and is automatically opened by deflation of said bellows means when the fan is not in operation, thereby providing a free air path to said air duct.

2. An apparatus according to claim 1, wherein the filter means contains a filter for removing particulate matter and a gas filter for removing toxic gases.

3. An apparatus according to claim 1, wherein the air duct is connected to a draft means for drawing air through said air duct.

4. An apparatus according to claim 3, wherein the draft means includes an air conditioner means.

5. An apparatus according to claim 1, wherein said bypass valve housing inlet port contains an annular flange, and said bellows means includes a resilient, pleated tube, one end of which is mounted in said housing and the other end is attached to a circular plate, which seats on said annular flange and closes said inlet port when the bellows is inflated and is withdrawn from said seat and opens said inlet port when the bellows is deflated.

6. An apparatus according to claim 5, wherein the circular plate contains a circular washer for seating on said annular flange.

7. An apparatus according to claim 5, wherein the housing is tubular and the bellows tube is axially oriented and affixed to a support plate mounted in said housing.

* * * * *